United States Patent [19]

Ciacci

[11] Patent Number: 4,872,138
[45] Date of Patent: Oct. 3, 1989

[54] TRANSPARENT CACHE MEMORY

[75] Inventor: Franco Ciacci, Magenta, Italy

[73] Assignee: Bull HN Information Systems Italia S.p.A., Caluso, Italy

[21] Appl. No.: 194,365

[22] Filed: May 16, 1988

[30] Foreign Application Priority Data

Jun. 3, 1987 [IT] Italy .............................. 20767 A/87

[51] Int. Cl.$^4$ .............................................. G11C 13/00
[52] U.S. Cl. ...................................... 365/49; 364/200; 369/122; 365/189.01
[58] Field of Search ........................ 369/122, 124, 200; 365/189, 230, 127, 49

[56] References Cited

U.S. PATENT DOCUMENTS

| | | | |
|---|---|---|---|
| 4,455,602 | 6/1984 | Baxter et al. | 364/200 |
| 4,493,027 | 1/1985 | Katz et al. | 364/200 |
| 4,525,780 | 6/1985 | Bratt et al. | 364/200 |
| 4,685,003 | 8/1987 | Westland | 360/14.1 |

Primary Examiner—Terrell W. Fears
Attorney, Agent, or Firm—George Grayson; John S. Solakian

[57] ABSTRACT

Transparent cache memory for data processing system in which a central processing unit requests the read out of information contained in a working memory at a current address and immediately receives, without waiting, the requested information from the cache memory if the requested information is contained in the cache memory. Meanwhile the cache memory performs the reading and the storing into the cache, of information contained in the working memory at the address next following the current address, so as to advance a possible subsequent request of the central processing unit. If the requested information is not contained in the cache memory, the cache memory performs a double memory read in page mode at the current memory address and at the next following address, thus minimizing the occupation time of the memory. The double reading is performed only for those addresses which allow for page mode operation.

4 Claims, 4 Drawing Sheets

TRANSPARENT CACHE MEMORY

BACKGROUND OF THE INVENTION

1. Field of Use

The present invention relates to a transparent high speed buffer memory or "cache" for data processing systems.

2. Description of Prior Art

It is known in data processing systems that in order to increase performance and to use the resources most efficiently, it is required that the operative speed at which the memory is capable of providing information to the central processing unit or, in case of multiprocessor systems, the processors, be greater than the operating speed of the central unit or the processors.

Usually the working memory is a "bottleneck" which slows down the working speed and decreases the system performance. Several arrangement have been proposed to remove this drawback.

One arrangement provides a working memory operating with multiple central processing units or several processors wherein the memory is divided into banks, blocks or with an interleaved structure. By dividing the memory in banks, several, independently addressable memories are obtained which may service simultaneous read write operations requested by different processors, provided these operations address different banks.

With an interleaved structure it is possible to simultaneously read or write in a plurality of memory locations having contiguous addresses (for instance even or odd) so that at each read/write request at a given address, the read/write operation of an information at a contiguous address is performed.

By providing suitable interface buffer registers between the central unit and the memory it is possible, in case the plurality of information handled by the central unit has sequential addresses, to halve the number of memory accesses. With the advent of data processing systems having 32 bits word this approach is expensive, because it requires a parallel readout of 64 bits.

A different arrangement, frequently used in computers of relatively high power, provides associative memories or "caches" dedicated to several processors which form the system. Such memories store a copy of information blocks recorded in the working memory, as well as the corresponding address. If a processor issues a memory read command for reading at a predetermined address, and this address is found to be present in the cache, the requested information is read out from cache and the working memory is not involved.

If the requested information is not in the cache, the requested information is read out from memory and a cache loading process is started. The requested information is then loaded into the cache, together with a block of information items having addresses contiguous to the address of the requested information.

The structure of such caches is complex and expensive, in that they require logical control circuits which supervise the updating of the cache contents when required, both for a better utilization of the information stored therein, and also to assume that the information stored in cache is the same information that is stored in working memory. This is despite the fact that another system processor may update working memory.

These limitations are overcome by the cache memory of the present invention, which is simple, compact and suitable for embodiment in an integrated circuit.

While in the prior art caches, the loading criterion is the loading of an information block when the requested information is not found in the cache, the criterion used by the cache structure which is the object of the present invention is that for each information requested to the memory, be it present in or missing from the cache, the cache is loaded with the information stored in main memory at the next following address.

In other words the criterion of "prevailing sequentiality" is exploited, wherein instructions and program data are stored in working memory to advance the reading of information in the reasonable prediction that, if information is requested which is stored at a given address, the information stored at the next following address is likely to be requested and is therefore made available without the delays intrinsic to a read memory operation.

This criterion is exploited in U.S. Pat. No. 4,620,277 to provide an early memory addressing of a control store dedicated to a single CPU in a multiple CPU environment.

The scope of the present invention is to provide a cache memory which can be used with a memory shared by multiple CPU and used for storing both instructions and data. The cache memory provides an early memory addressing which exploits at best the "prevailing sequentiality" criterion.

SUMMARY OF THE INVENTION

Since the sequential criterion is generally followed separately by instructions and by data, the cache of this invention substantially comprises an incrementing unit for generating a next address based on a current address, a latching register for latching a next address of instruction, a latching register for latching a next address of data, two latching registers for storing the instruction and data respectively whose address is stored in the address registers, two comparators for comparing the current address of information to be read out from memory with the information contained in the next address registers and logical circuits which, based on the result of such comparison provide:

A. in the case of a successful comparison:

to transfer to the requesting processor the information already contained in the instruction or data latching register and to start a memory read at the incremented address (next address) generated by the incrementing unit.

B. in the case a of unsuccessful comparison:

to start a first memory read at the current address, to transfer the read out information to the requesting processor and to start a second memory read at the incremented address generated by the incrementing unit.

A cache memory so implemented is "transparent", that is it does not need the complex managing systems required by conventional caches. As to its interaction with the central unit, it receives signals normally provided to the working memory and limits its response to the generation of signals which would be generated by a working memory. It does not need management mechanisms for operation presetting, nor loading from the central unit, which waste central unit time.

A further aspect of the invention is that in particular circumstances, the subsequent execution of two memory read operations are performed in the so called "page mode", with a substantive saving in time and constructive components.

Two advantages are therefore achieved:

At the level of central unit using the cache, every time the requested information is already contained in the cache, it can be made available to the central unit without delays; and during the processing of such information it is possible to read out from memory new information which is likely to be requested thereafter. By means of this overlap mechanism, the central unit may operate at a higher speed.

At the system level, each time the central unit requests information which is not available in the cache, such information is read out from working memory and, if and only if a double read operation is possible in "page mode", the information stored at the next following address is read out too. That the information is therefore available if subsequently required.

In this way the global occupation time of the working memory by the ache is reduced to a minimum and the burden of performing a full memory cycle for reading information which may not be needed, is avoided.

A further aspect of the cache of the invention is by providing latching registers for data read-out from memory and being dedicated to a specific central unit of the data processing system, the memory may be accessed by a plurality of processors, other than the central unit to which the cache is dedicated, without having such processors modifying the status of the cache registers, thus rendering ineffective the read pre-execution mechanism, owing to interleaved memory read operations performed by different processors.

In particular it is also possible to assure the congruence between the contents of the cache and the contents of the working memory, which may be modified by write operations performed by any processor, both by means of well known software techniques, and by means of hardware circuits which will be described.

These and other features of the invention and the advantages thereof will appear more clearly from the following description of a preferred form of embodiment and from the enclosed drawings where:

DESCRIPTION OF THE PREFERRED EMBODIMENT

Figure 1:
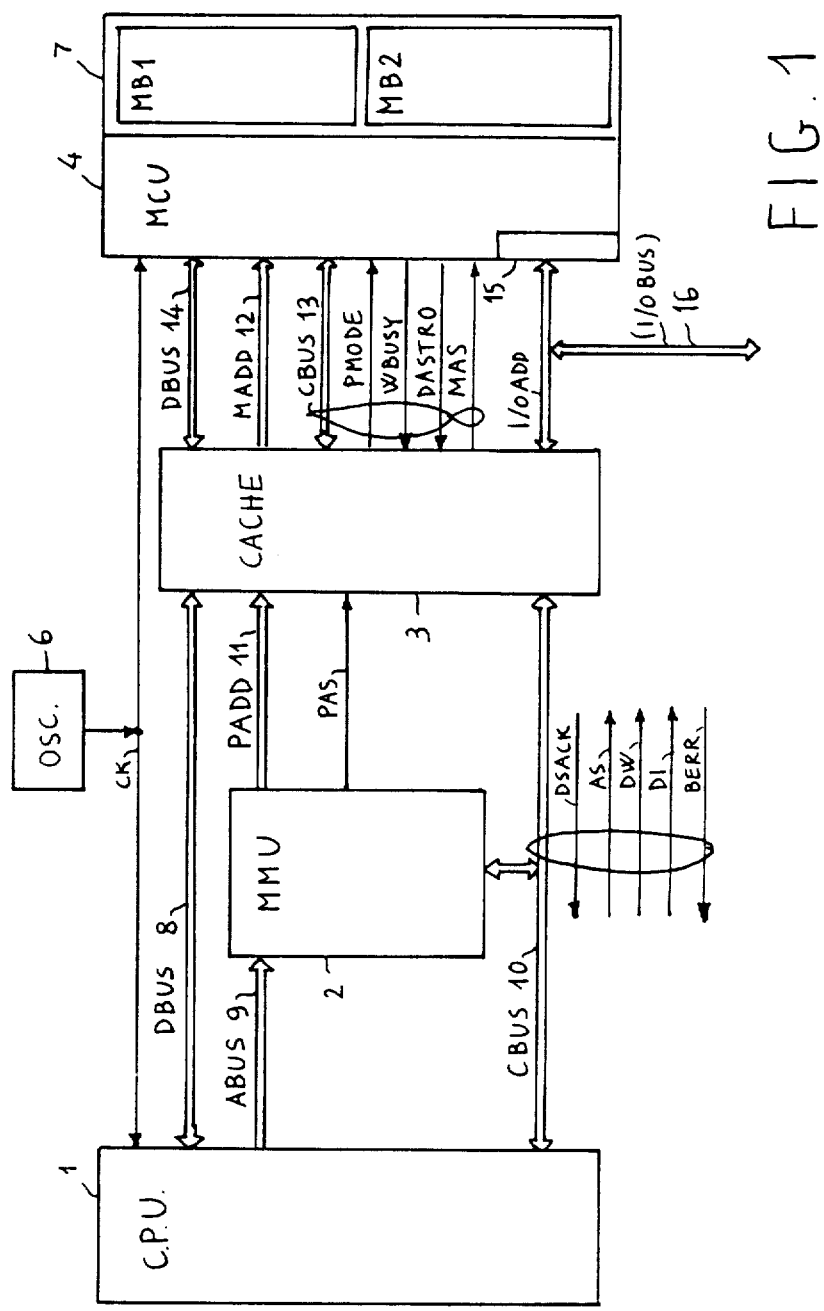
FIG. 1 is a block diagram of a data processing system embodying the cache memory of the invention.

FIG. 1 is a block diagram of a data processing system incorporating the cache memory of the invention.

The system comprises a central processing unit (CPU)1, a memory address management unit (MMU)2, the cache memory 3, a memory control unit (MCU)4, an oscillator 6 for generating a periodic timing signal and a working memory 7 comprised of a plurality of modules, arranged, by way of example in two blocks MB1, MB2.

Even if CPU 1, MMU 2 and working memory 7 may be implemented in several ways, it is advisable, for sake of clearness, to refer to a CPU 1 as typically a microprocessor MC 68020, and to the related MMU 2 as typically a MC68851 integrated circuit, both manufactured by Motorola.

In FIG. 1 the system architecture is conventional: CPU 1 is connected to the working memory 7 for information transfer (read/write) through a data bus DBUS 8, the cache memory 3, a data bus DBUS 14 and the memory control unit 4.

The required memory address is provided by CPU 1 through address channel ABUS 9, via memory management unit 2, which converts a virtual address in a physical address and inputs it through output channel PADD 11, cache memory 3, channel MADD 12 to the memory control unit 4.

Transfer control signals are exchanged among CPU 1, MMU 2, cache memory 3, through control channel CBUS 10, and between cache memory 3 and memory control unit 4 through control channel CBUS 13. DBUS 14, MADD 12, and CBUS 13 make up a communication port for memory control unit 4 which is dual ported, that is provided with a second port 15 connected to a communication bus 16 for connection to I/O processors and peripheral control units, not shown. Memory control unit 4 resolves, in a conventional manner, conflicts among memory access requests coming from the two ports, on the basis of suitable priority criteria.

For a better understanding of some implementation aspects of the cache memory of the invention, it is advisable to advance some considerations on the information or operands transferred between CPU 1 and memory 7 as well as on memory 7 organization.

CPU 1, channels DBUS 8, DBUS 14 and memory 7 transfer 32 bits in parallel. At each memory cycle 4 bytes can be transferred. The addressing structure of CPU 1 is at byte level with a 32 bit address code A0–31 present on ABUS 9. The minimum operand length is generally 16 bits (a word).

Memory 7 is organized in 4 byte blocks, each addressed by the most significant address bits, with the exclusion of the least significant address bits, A0, A1. Each memory access operation may therefore refer to a word operand, identified by an address A2–31 and located in memory block MB1 or MB2 depending on the state of bit A1, or to a double word operand, which must be aligned with the memory structure and therefore is identified by an address where bit A1 is equal to 0.

CPU 1 internally provides non aligned double word operands in two distinct operands which are transferred with two separate memory access operations. When starting a memory access operation, CPU 1 generates on some control leads, (channel CBUS) signals which indicate if the operand to be transferred is a single or a double word. Other control leads signal if the operand to be transferred is a data or an instruction operand.

For sake of simplicity it is assumed that the operand length is defined by a single signal DW, which at level 0 indicates a single word operand and at level indicates a double word operand. Signal DW may be obtained with a very simple decoding of the signals generated by CPU 1. Likewise it is assumed that CPU 1 identifies the operand as a data or instruction operand by means of a single signal D/I which is 0 for indicating a data operand and a 1 for indicating an instruction operand.

Figure 2:
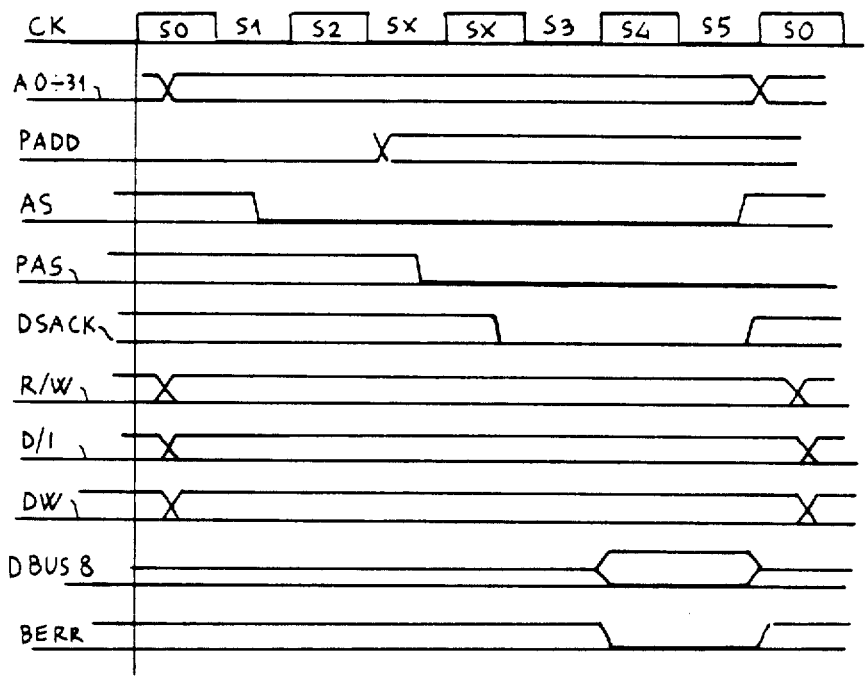
FIG. 2 is a timing diagram showing the operation of the central processing unit of FIG. 1.

Hereafter for a better understanding of the invention, the operation of the CPU 1 and MMU 2 memory transfer is described with reference to the timing diagram of FIG. 2.

The operation of CPU 1 is timed to a periodic signal CK generated by oscillator 6. Signal CK has, typically, a period of 60 nanoseconds (nsec) and comprises two square wave half periods of 30 nsec duration each. Each half period defines a CPU 1 working state. A memory read operation requires six working states and a variable number of wait states, depending on the speed at which the memory 7 is capable of responding to the CPU 1 request.

During a first state S0, CPU 1 puts a logical address A0-31 on address bus 9 and a set of control signals on control bus 10. Included in the control signals are signal R/W at level 1 to indicate a read operation, signal D/I (D/I=0 for a data, D/I=1 for an instruction) and signal DW (single or double word).

During state S1, CPU 1 forces a signal AS to 0 to validate the signals present on address bus 9 and control bus 10.

MMU 2 receives control signal D/I, logical address A0-31, address strobe signal AS and with a maximum delay of 45 nsec from the receipt of AS, puts on channel PADD 11 the physical address corresponding to the logical address and generates a strobe and validation signal PAS at 0. This event occurs in state SX next following state S2. If, during state S2 CPU 1 does not receive a signal DSACK at logical level 0, it puts itself in a wait state SX for one or more clock periods.

Signal DSACK received by CPU 1 must guarantee to CPU 1 that with a delay of a clock period at the latest, the requested information will be available on the data bus. When signal DSACK is received, CPU 1 moves to states S3 and S4 and, at the end of state S4 it loads the information present on data bus DBUS 8 into an internal register of CPU 1.

The loading occurs only if CPU 1 receives a signal BERR at logic level 1 on a lead of the control bus 10. Signal BERR at level 1 indicates that the read operation has been performed correctly and no error is present in the read out operand. In case of error, BERR must be set to level 0 at least 20 nsec in advance of the transition from state S4 to state S5. At the conclusion of the read operation, CPU 1 generates signal AS at level 1 during state S5. When MMU 2 and the unit which has generated the DSACK signal receives signal AS at level 1, they generate signal PAS and signal DSACK at level 1.

From the preceding description it is clear that memory control unit MCU 4, in order to operate with CPU 1, needs to have a data input/output channel, an address input channel, a signal input for starting the memory operation (signal PAS may perform this function), an input for receiving R/W and must be capable of generating a signal DASTRO to perform the function requested by signal DSACK.

Therefore MCU 4, as well as memory 7, may be of the conventional type. Preferably memory 7 has a size of 2 exp 22 double words and is page organized.

Each memory entry is referenced by a physical address PA0-21 (bit PA22 references only the word within the entry). Bits PA0-12 define a row address and bits PA 13-21 a column address.

The page organization enables, in well known way, to perform read/ write operations in "page mode". In other words, the memory may be controlled to perform two or more subsequent read/write operations, maintaining unchanged the row address and changing at each memory (shortened) cycle the column address.

This working mode is controlled by a signal PMODE received as input by MCU 4 from cache 3.

Figure 3:
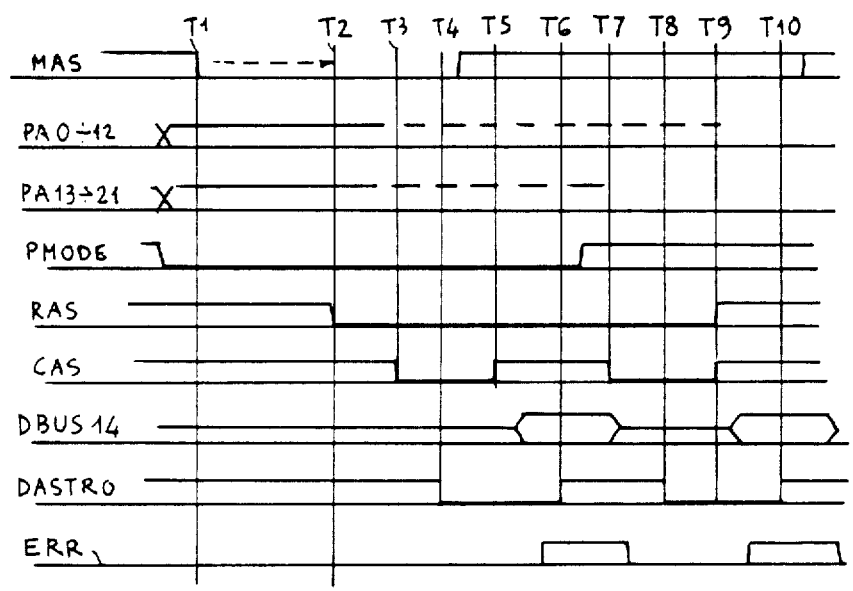
FIG. 3 is a timing diagram showing the operation of the working memory and related control unit of FIG. 1.

FIG. 3 shown in timing diagram the operation of MCU 4 and of related working memory 7.

At time T1 MCU 4 receives an address (PA0-12 and PA13-21) on address bus 12 and an address strobe and memory request signal MAS at level 0. MCU 4 also receives a signal PMODE at level 0 for controlling the operation in "page mode". If the memory 7 is busy, for instance because a memory access through the second I/O port is being executed, the request is delayed until time T2. At time T2 the memory request is acted upon. The address is transferred to memory and the row address is strobed by a signal RAS. At time T3 a signal CAS at level 0 validates the column address and at a time T4 MCU 4 outputs a signal DASTRO at level 0. At time T5 signal CAS rises to level 1 and immediately thereafter the data is available from memory 7 and is put on data channel DBUS 14. At time T6, the DASTRO signal rise to level 1, to indicate that the data is available.

If the PMODE signal is at level 0, a new read cycle is started and a new column address must be present on the address bus at least before time T7, at which time CAS signal falls to level 0. At time T8 signal DASTRO falls to level 0 to signal that within a predetermined time interval new data will be available on data bus DBUS 14. At time T9 the CAS and RAS signals rise to level 1 (provided signal PMODE is at level 1) and new data is made available on data channel and can be strobed with signal DASTRO rising to level 1 at time T10. This ends the memory operation.

The data present on data bus 14 are accompanied, in case of error, by a signal ERR at level 1 on an error output.

Other signals, including R/W, are present at the communication interface between MCU 4 and CPU 1 but are not essential for the understanding of the invention.

The times T1 through T10 are defined by a memory timing unit, as a function of the memory speed. The only timing requirement imposed on the system from outside of memory is that signal DASTRO must not have a duration greater than 60 nsec at level 0 to meet the requirement imposed by CPU 1.

Figure 4:
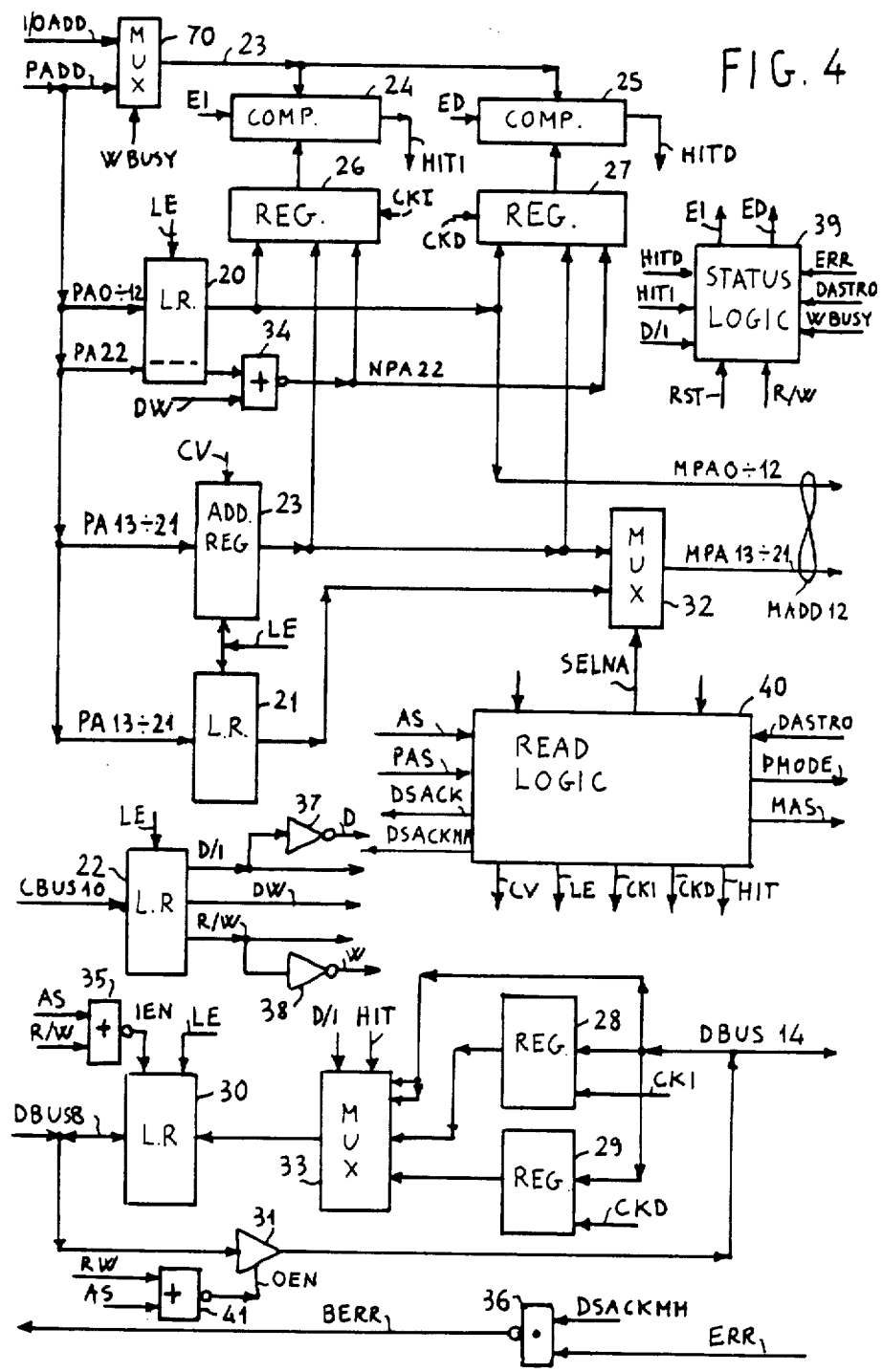
FIG. 4 is a circuit diagram of the cache memory of the invention.

It may now be considered how the cache memory 3 of the invention is located and operates between the interface defined by CPU 1 and MMU 2 on one side and the interface defined by MCU 4 on the other side. The cache memory 3 block diagram is shown in FIG. 4.

The cache memory 3 comprises a plurality of transparent latch registers 20, 21, 22, 30, an adder with transparent latch output register 23, two comparators 24, 25, four registers 26, 27, 28, 29, a set of tristate gates 31, three multiplexers 32, 33, 70, three NOR gates 34, 35, 41, one NAND gate 36, two NOT gates 37, 38 and two functional blocks 39,40 respectively for controlling the status of the cache memory (block 39) and for controlling the read operations performed by the cache memory (block 40).

The two comparators 24 and 25 have a first input set connected to channel PADD 11 to receive from MMU 2 the physical addresses PA0-22 present on the channel, through a multiplexor 70, which may be omitted because it performs an auxiliary function considered later on.

A second input set of comparators 24 and 25 is respectively connected to the outputs of registers 26 and 27.

The two comparators 24 and 25 receive at a control input, signals EI and ED respectively, generated by status logic block 39.

When signals EI and ED are at logic level 0, the two comparators are disabled and output signal HITI and HITD respectively are at logic level 0.

When signals EI and ED are at logic level 1, the comparators 24 and 25 are enabled and, if the code received at the first input set coincides with the code received at the second input set, comparator 24 or 25 generates output signal HIT and HITD, respectively at logic level 1. The signals are normally at logic level 0.

Latch registers 20, 21 and adder 23 have their inputs connected to channel PADD 11 to respectively receive address bits PA 0-12 and PA 22 from register 20 and address bits PA 13-21 from register 21 and adder 3.

A control signal LE generated by logic block 40 at level 1 enables the registers to the input signals. When signal LE is at level 0 the status of the registers is "frozen".

Adder register 23 receives a signal CV at a second control input. CV is generated by logic block 40. When CV is at level 0 the adder increments the code received as input by 1 and transfers it to the output. When CV is at level 1 the adder transfers to the output the code received at the input.

The outputs of register 20, with the exception of the one corresponding to address bit PA22, are connected to the inputs of registers 26 and 27. Similarly, the outputs of adder 23 are connected to the inputs of registers 26 and 27. The output of register 20 corresponding to address bit PA22, is connected to an input of NOR gate 34, which receives signal DW coming from register 22, at a second input.

The output of NOR gate 34 is connected to an input of registers 26 and 27. The registers 26 and 27 are loaded with the input information by the falling edge of a control pulse CKI and CKD respectively, which are generated by logic block 40.

Register 22 has its inputs connected to control bus CBUS 10 and latches the several commands D/I,DW,R/W present on the bus. Commands D/I and R/W are inverted by inverters 37 and 38, to generate signals D and W respectively.

The outputs of adder/register 23 and register 21 are connected to two input sets of multiplexer 32 whose outputs MPA 13-21, along with outputs MPA 0-12 from register 20, constitute the address channel MADD 12 for MCU 4. Multiplexer 32 is controlled by a signal SELNA provided by logic block 40. If SELNA is at level 0 the information output from adder/register 23 is transferred to the output of multiplexer 32. If SELNA is at level 1 the information output from register 21 is transferred to the multiplexer output.

The inputs of registers 28, 29 and a pair of input sets of multiplexer 33 (having four input sets) are connected to channel DBUS14 input/output data bus for MCU 4. The outputs of registers 28, 29 are respectively connected to the other two input sets of multiplexer 33, whose outputs are connected to the inputs of latch register 30, having tristate outputs connected to data bus DBUS 8 of CPU 1. Registers 28 and 29 are controlled, similarly to registers 26 and 27, by load pulses CKI and CKD, respectively.

Multiplexer 33 is controlled by two signals D/I and HIT, the first being an output from register 22, the second being generated by logic block 40. When HIT is at level 0, multiplexer 33 outputs the information present at the register 28 output or at the register 29 output depending on D/I being at level 1 or level 0 respectively. When HIT is at level 1, multiplexer 33 outputs the contents of channel DBUS 14, independently of the level of signal D/I.

Register 30 has inputs enabled by signal LE. Its tristate outputs are enabled by a signal IEN at level 1. If signal IEN is at level 0 the outputs are held in a high impedance state.

The IEN signal is generated by NOR gate 35, which receives signal AS from CPU 1 and signal W from the output of inverter 38.

The tristate gates 31 have inputs connected to the bus DBUS 8 and outputs connected to bus DBUS 14 and is enabled by a signal OEN at level 1. When OEN is at level 0 the outputs are held in a high inpedance state. The OEN signal is output from NOR gate 41, which receives as input, signal AS (from CPU 1) and signal R/W from register 22.

The error signal ERR from MCU 4 inputs NAND gate 36, which receives at a second input, a DSACKMM control signal generated by logic block 40. When DSACKMM is at level 1 the logic level of signal BERR is the same as signal ERR and is forwarded to CPU 1.

Before describing in detail the status logic 39 and the control logic block 40 it is advisable to briefly describe the function performed by the cache memory.

Basically the cache memory has to anticipate the working memory reading on prediction of a data or instruction request, making available the already read out information as soon as it is requested. To this purpose registers 28 and 29 store a NEXTI (next instruction) and a NEXTD (next data) respectively, whose memory addresses are respectively loaded in registers 26 (NEXTI ADD) and 27 (NEXTD ADD).

In general, when CPU 1 requests a memory read operation for obtaining a data or instruction operand, the address of the requested operand is input to comparators 24 and 25. If neither one of comparators provides a hit signal, this means that the requested operand is not present in either register 28 or 29. Therefore the control logic 40 generates a memory read command MAS, which is forwarded to MCU 4 along with the address of the requested operand, the address being transferred on channel MADD12 through registers 20, 21 and multiplexer 32.

On receipt of the double word containing the requested operand (working memory 7 ignores bit PA22), this double word is transferred through DBUS 14, multiplexer 33 and register 30 on bus DBUS 8 of CPU 1. It is further loaded into register 28 or 29 depending on whether it is an instruction or data.

At the same time a new address is loaded into register 26 or 27, depending on whether the information is being an instruction or data. The new address is obtained from the current address in accordance to the following rule. If bit PA22 of the current address is 0 and the length of the requested operand is a single word (DW is at level 0), the NPA22 bit loaded in register 26 or 27 is put equal to 1 and bits PA 13-21 are not modified (the adder 23 incrementation is inhibited by signal CV at level 1).

In the other possible alternative (PA22 at level 1 or DW at level 1) bit NPA22 loaded in register 26 or 27 is set to level 0. Moreover, if bits PA13-21 not all ones then the bits PA13-21 are loaded into register 26 or 27 and are incremented by one (the adder 23 is enabled by signal CV at level 0).

It is clear that where the current address has PA22 at level 0 and DW is at level 0 then the new operand defined by the next subsequent address is made available by the read operation and latched in register 28 or 29, on prediction of its future need by CPU 1.

On the contrary, if bits PA13-21 of the current address, which correspond to a column address are not all ones and do not define the end of a memory page, which would preclude the feasibility of a second read operation "in page mode", the control logic block 40, testing the occurrence of these conditions, controls a second memory read, in page mode, at a new address corresponding to the one present in register 26 or 27 and loads the read out information in register 28 or 29 where it is available on prediction on a next request from CPU 1. Therefore the same relation existing between memories locations and related contents generally exist between addresses contained in register 26, 27 and operands contained in registers 28 and 29. Later on possible exceptions will be considered.

Now, if CPU 1 controls a read memory operation and one of the comparators 24 or 25 provides a hit (positive comparison result), then the requested information is already available in register 28 or 29. Therefore control logic 40 immediately generates signal DSACK for the CPU 1 to transfer the requested information, through multiplexor 33 and register 30 to data bus DBUS 8.

In addition, if this is justified and permitted by the received conditions, that is if PA22 or DW are at level 1 and at the same time PA13-21 are not all ones, logic block 40 controls a memory read operation at the following memory address and loads the read out information in the proper register 28 or 29 and the related address in the proper register 26 or 27.

It is therefore clear that in the course of sequential memory addressing by CPU 1, once the cache memory 3 has been loaded, the requested information items are already available in the cache 3 and no waiting time is spent by CPU 1, the request of information which will become needed in the following memory read operation is anticipated by the cache memory.

It has been mentioned that possible exceptions may occur in the relationship between memory addresses stored in register 26, 27 and registers 28, 29. These exceptions are due to several causes:

First, when the system is initialized, registers 28 and 29 are empty or have random contents. Therefore comparators 24 and 25 have to be disabled, so as to avoid their providing an incorrect positive comparison result.

It may further happen that in the course of a process performed by CPU 1, a write operation at an address N+1 follows a read operation at an address N (by which the cache memory is in fact loaded with an information at address N+1). In this case the information contained in the cache 3, is no longer the information contained in the working memory at the same related address. Further it may happen that in the course of a read operation, performed in an autonomous way by the cache memory 3, an error is detected. Even in this case it is advantageous, that rather than latching the error indication for next consideration by CPU 1, to disable the related comparator 28 or 29.

In this way, if CPU 1 requests the information at address N+1, a memory read operation is started with some chance, if the error was of transient nature, to receive a correct information and to avoid the start of error recovery procedures.

Consistent with these exceptions, status logic block 39 provides for:

A. disabling both comparators at initialization reset.

B. disabling comparator 24 in case a hit occurred during an instruction write operation in case an uncorrectable error was detected when reading an instruction. In both cases the occurrence was at the address following the current one.

C. disabling comparator 25 in case a hit occurred during a data write operation or in case an uncorrectable error was detected when reading data, in both cases at the address following the current one.

Status logic block 39 enables comparators 24 and 25 one at a time, once a memory read operation of an instruction or a data with no error has been performed. The contents of this operation systematically reestablishes the identify between register 28 or 29 and the contents of the addressed memory location, as well as the identify of the address loaded into register 26 and 27 (less bit PA22) and the address of the read out memory location.

Figure 5:
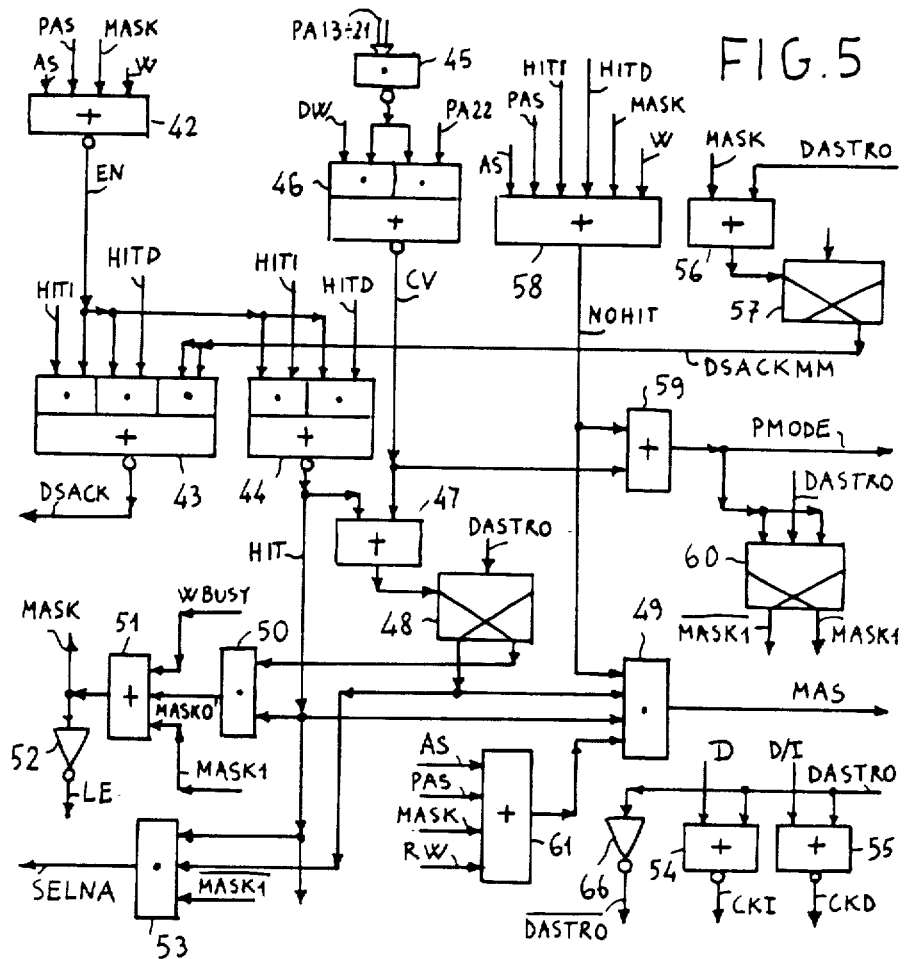
FIG. 5 is a detailed circuit diagram of the control logic for the cache memory of FIG. 4.

FIG. 5 shows the logic diagram of a preferred embodiment of control logic 40.

A NOR gate 42 receives signals AS, PAS, MASK and W and outputs a signal EN at logic level 1, only when all input signals are at logic level 0, that is only if CPU 1 controls a read operation (AS at level 0, W at level the physical address is present (PAS at level 0) and MASK at level 0.

It will be seen later that signal MASK is generated by logic block 40, when it requests the start of a memory cycle, MASK falling to level 0 once the memory cycle has been completed. MASK signal prevents cache memory 3 from performing a memory read operation, before a previously started read operation is completed.

Basically, a delay in the completion of a memory read operation requested by cache memory 3 may be due to the circumstance that the working memory is already busy, performing operations requested by I/O units through the second port since MCU 4 is dual ported.

Signal EN defines a time interval or time window, during which signals HITI and HITD, the output from comparators 24 and 25, are valid and stable. Signal EN is input to a pair of AND sections of AND/OR/INVERTER 44. Each of these two AND sections of gates 43 further receives signals HITI and HITD from comparators 24 and 25, respectively. Gate 43 outputs signal DSACK to CPU 1 and gate 44 outputs a HIT signal at level 0 which perform several functions including the control of multiplexer 33.

It is clear that if MASK is at level 0, and the cache memory 3 is not running a memory request, as soon as a memory request is raised (AS at level 0, W at level 0) and the physical address is available (PAS at level 0), if there is a hit between physical address and one of the addresses contained in register 26 and 27 (HITI at level 1 or HITD at level 1), signal DSACK falls to 0 (together with signal HIT), with a delay limited to the propagation delay of gates 42 and 43 which may be within the limit of 20-30 nsec. At the same time multiplexer 33 outputs the requested information to register 30, which in turn transfers it to DBUS 8. Signals DSACK and HIT remain at level 0 until CPU 1 signal AS rises. The CPU 1 then concludes its read cycle which, it is to be noted, does not affect the working memory 7.

A NAND gate 45 receives bits PA13-21 as inputs. If they are not all ones, gate 45 outputs a signal at level 1 which enables the two AND section of AND/OR/INVERTER 46. Gate 46 receives at the input AND sections signal DW and PA 22 respectively. Therefore if the conditions which justify and permit a memory write operation to the next sequential address are met, signal CV at the output of gate 46 falls to level 0.

Signals HIT and CV input an OR gate 47, whose output is connected to the set input of a JK flip flop 48. As soon as signal HIT falls to level 0, if signal CV is also at level 0, flip flop 48 is set. The inverted output of flip flop 48 is connected to an input of an AND gate 49, which receives signal HIT at a second input and outputs signal MAS. Thus, as soon as signal HIT falls to level 0, signal MAS also falls to level 0 and remains to 0 until the reset of flip flop 48. A memory read request is therefore generated.

Flip flop 48 is reset by the rising edge of signal DASTRO received from MCU 4. Therefore the memory request is maintained until accepted by the working memory 7. The noninverting output of flip flop 48 is connected to an input of AND gate 50 which receives signal HIT at a second input. Gate 50 outputs a signal MASK0 which rises to level 1 together with the HIT signal and remains at level 1 for the time flip flop 48 is set. Signal MASKO, through OR gate 51 generates signal MASK, from which signal LE is generated by an inverter 52.

Signal HIT is further input to AND gate 53 whose second input is connected to the inverting output of flip flop 48. AND gate 53 generates signal SELNA which controls multiplexer 32. Thus, as soon as signal HIT falls to level 0, signal SELNA also falls to level 0. This selects the working memory address from register 23, which previously was incrememted since signal CV is at level 0.

When signal HIT rises to level 1, signal MASK rises to level 1, signal SELNA remains at level 0 and signal EN falls to level 0, thereby disabling the inputs of registers 20, 23, 21, 22, and 30, until the reset of flip flop 48, that is until the execution of the memory read operation.

Once the memory read operation has been completed, signal DASTRO, is applied to NOR gates 54, 55 which receive at a second input, signals D and D/I respectively. They cause the generation of a positive control pulse CKI or CKD, whose falling edge controls the loading of registers 26 and 28, or 27 and 29. Registers 28 and 29 store the operand that was just read from memory.

It will be noted from the diagram of FIG. 5, that the DASTRO signal is also applied, through OR gate 56, to the set input of flip flop 57, whose direct output is connected to an AND section of AND/OR/INVERTER 43. However, if signal MASK is at level 1, the signal DASTRO does not have affect flip flop 57, and therefore the generation of a new DSACK signal towards CPU 1 does not occur.

In conclusion, when signal HIT is at level 0 and signal CV is at level 0, the operand request generated by CPU 1 is immediately honoured by the cache memory 3, which starts a memory read operation without involving CPU 1.

Consider now the case in which comparators 24 and 25 do not provide a hit signal. An OR gate 58 receives as inputs, signals AS, PAS, MASK, W, HITI and HITD. Signals AS,PAS,MASK define the time window in which signals HITI and HITD are valid.

Therefore, if within that window, signals HITI, HITD are at level 0 and a read operation is called for signal W is at level 0, then the output of OR gate 58, signal NOHIT falls to level 0. The output of gate 58 is connected to an input of AND gate 49. Therefore signal NOHIT at level 0 causes the generation of the memory access request signal MAS at level 0.

During the memory operation, the falling of the DASTRO signal to level 0 causes the output signal from gate 56 to set Flip Flop 57. This generates signal DSACKMM which is applied to the AND/OR/INVERTER 43 to generate the signal DSACK at level 0. This signals CPU 1 that the memory cycle is completed and the requested information is transferred to CPU 1 via DBUS 14, multiplexer 33, register 30 and DBUS 8.

The read out operand and the corresponding address, which is the current address, are further loaded into registers 28 or 29 and 26 or 27 respectively.

Further, if the conditions which call for a second memory read occur, that is signal CV is at level 0, the presence of signals NOHIT and CV at level 0 at the input of OR gate 59 generatesn signal PMODE at level 0. This signal informs MCU 4 that the requested read operation is multiple, that is in "page mode". Signal PMODE is applied to the J, K inputs of flip flop 60, which receives signal DASTRO at the clock input. If PMODE is at level 1, the rising edge of signal DASTRO resets or holds in reset flip flop 60. Otherwise, flip flop 60 would be set if signal PMODE is at level 1.

Therefore at first memory read cycle signal DASTRO rises to level 1, flip flop 60 is set and its output signals MASK1 rises to level 1 and MASK1 INVERTED falls to level 0. Signal MASK1 is applied to OR gate 51 which raises MASK to level b 1 and lowers signal LE to level 0 via inverter 52. MASK1 INVERTED is applied to AND gate 53, which generates signal SELNA at level 0.

Multiplexer 32, which up to that time was transferring, the current address contained in register 21 to MCU 4 is therefore switched to transfer the following column address contained in register 23.

Therefore a second memory read operation is performed, at the conclusion of which, with the rising of signal DASTRO, flip flop 60 is reset (PMODE is brought to level 1 by signal MASK, via OR gate 58) and the new read out operand and related address are loaded in register 28 or 29 and 26 or 27 respectively.

In the case of a memory write operation, the control logic block 40 is involved only in a marginal way; an OR gate 61 receives signals AS, PAS, MASK and RW as inputs and has the output connected to an input of AND gate 49. Therefore it limits its operation to the generation of signal MAS and to the generation of signal DSACK to CPU 1 via OR gate 56, flip flop 57, signal DSACK to CPU 1, to indicate that the memory write operation has been completed.

Figure 6:
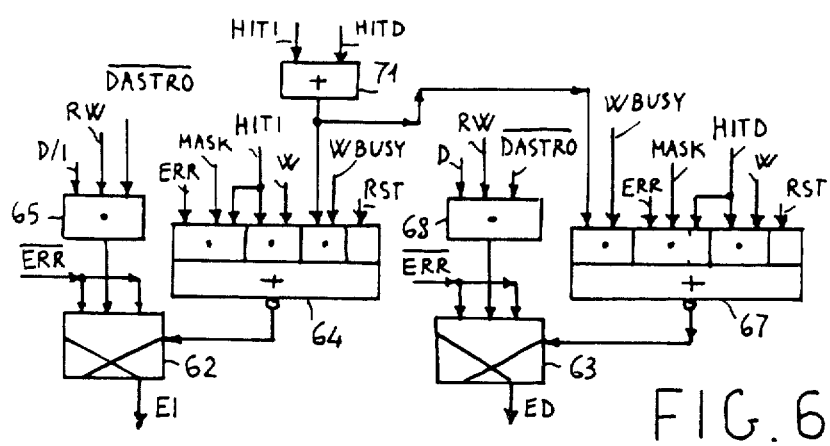
FIG. 6 is a detailed circuit diagram of a status logic for the cache memory of FIG. 4.

FIG. 6 is a diagram of status logic block 39, which essentially comprises two flip flops 62 and 63.

Flip flop 62 has the reset input connected to the output of an AND/OR/INVERTER gate 64. A first AND section receives an initialization reset signal RST. A second AND section receives signals HITI and W. A third AND section receives signals ERR, MASK, HITI.

Therefore flip flop 62, provides signal EI as a direct output, is reset on the occurrence of each of several indicated conditions.

The J, K inputs of flip flop 62 receive signal ERR INVERTED and flip flop 62 is set by a negative transition received at the clock input if ERR is at level 0, otherwise it is held reset.

The clock input is connected to the output of AND gate 65, which receives as input signals D/I, RW and DASTRO INVERTED (obtained from DASTRO through inverter 66 of FIG. 5).

Thus flip flop 62 is set, and signal EI rises to 1 on the occurrence of the above mentioned enabling conditions.

Flip flop 63 which generate signal ED is controlled substantially in the same way through a reset AND-/OR/INVERTER gate 67 and a clock AND gate 68.

The only difference between gates 64 and 67 is that the AND sections of gate 67 receive signal HITD instead of HITI, and the difference between gate 65 and 68 is that gate 68 receives signal D instead of D/I.

It is clear that the preceding description refers to a preferred embodiment of the invention which, at broad extent, depends on the requirements of CPU 1 and MCU 4, and that memory organizations other than the described one may make for a simpler or a more complicated control logic.

For instance if data and instructions are always arranged in double words, or more generally with the same memory parallelism, the expedients related to the handling of bit PA22 and to the control of adder 23 become superfluous.

A further aspect relates to the synchronous, asynchronous operation of the cache memory. In the described embodiment a control logic has been used which is timed by control signals received from CPU 1 and MCU 4. It is however possible to use control logic timed by an external timing signal and provided, in case, with timing units, triggered by an external clock signal to generate suitable control signal sequences. This approach may be valid in case the system uses CPU's other than those implemented with microprocessor 68020. Such CPUs may need the masking of received clock signals, until the occurrence of predetermined events, in particular the availability of requested operands, to resume operation in synchronism with a system clock signal.

The problem of congruence between the contents of registers 28, 29 the cache memory 3 and the contents of the working memory 7 deserves particular consideration.

It has been already seen that in case of a write operation by CPU 1 on working memory 7, the cache memory 3 controls that the memory addresses which do not coincide with addresses contained in registers 26, 27. If this occurs the status logic 39 signals disable comparators 24 and 25.

However it is noted that the working memory 7 can be addressed for write operations, by I/O processors, through port 15 (FIG. 1). Therefore a write operation, performed by an I/O processor, must be avoided wherein the contents of memory locations are changed, if such contents are also stored in one of the two registers 28 and 29. If this happens, it is mandatory to invalidate the contents of registers 28, 29 by disabling comparators 24, 25.

At software level the problem is solved with a suitable mechanism called 'resource locking' by which one processor is exclusively enabled to obtain access for writing, to predetermined memory areas, while such access is at the same time inhibited to any other processor.

At the hardware level, the problem is solved, in case of the cache memory of the invention, by the following arrangements. It is assumed (FIG. 1) that MCU 4, controlling access to the working memory by several processors, generates a signal WBUSY at level 1 every time it grants memory access, during a write operations, to an I/O processor, through gate 15. In particular it is assumed that this signal is synchronized with the system clock signal CK, and goes high with the rising edge of clock signal CK. In its turn the cache memory 3 is provided (FIG. 4) with multiplexer 70 having a first input set connected to bus PADD 11 to receive the physical address generated by MMU 2 and having a second input set connected to channel I/O ADD where memory addresses, generated by I/O processor are present. This I/O ADD channel is part of I/O BUS 16.

Multiplexer 70 has the outputs connected to a first input set of comparators 24 and 25 (FIG. 4) and is controlled by signal WBUSY to transfer the information present on channel PADD 11 if WBUSY is at level 0 or the information present on channel I/O ADD if WBUSY is at level 0.

WBUSY signal is further applied to OR gate 51 to generate signal MASK at level 1 every time MCU 4 assigns memory 7 to an I/O processor for a write operation.

It is therefore clear that in the case of a memory write operation by any of the I/O processors, access to the cache memory 3 by the CPU 1 is temporarily inhibited (MASK at level 1) while the cache memory 3 compares the memory address present on channel I/O ADD with the addresses contained in registers 26 and 27. If the comparison is positive signal, signals HITI or HITD are generated. The status logic block 39 (FIG. 6) includes an OR gate 71 which receives signals HITI and HITD as inputs.

The output of OR gate 71 is connected to an input of a fourth AND section of gates 64 and 67. Signal WBUSY is also an input to this fourth AND section. Therefore in case of a hit on a I/O write, the status logic 39 disables comparators 24 and 25 until the read operations controlled by CPU 1 are finished, and the cache memory 3 is again available.

What is claimed is:

1. Transparent cache memory for a data processing system in which a central processing unit (CPU) requests the information from a working memory, accessible by other system units, comprising.
    an input address bus (PADD) for receiving from said CPU a current memory address,
    an input control bus for receiving a read/write control signal and a signal identifying the information to be written or read out as an instruction or a data, characterized by that said cache memory comprises:
    a current memory address latching register (20,21) for latching the address received from said input address bus,
    an incrementing register (23) for latching a next subsequent memory address, equal to the address received from said input address bus, incremented by one,
    a first (26) and a second (27) latching register having inputs connected to the outputs of said incrementing register (23) for latching said next memory address, respectively when said next memory address is an instruction address or a data address, a first multiplexer (32) having inputs connected to the outputs of said incrementing register (32) and to the outputs of said current memory address latching register (21) for selectively transferring on an address output channel (MADD) said current memory address or said next memory address.

an input bus (DBUS 14) for receiving information read out from said working memory, a third (28) and a fourth (29) latching register, having inputs connected to said input bus for storing the information read out from said working memory, respectively when said information is an instruction or a data, a second multiplexer (33) having inputs connected to said input bus (DBUS 14) and to the outputs of said third (28) and fourth (29) register for selectively transferring in output the information present on said input bus, or in output from said third or fourth register, an output register (30) having inputs connected to the output of said second multiplexer and outputs connected to an output bus (DBUS 8) for storing the information present at the output of said second multiplexer, a first (24) and a second (25) comparator for comparing the current address present on said input address bus and the address latched in said first (26) and second (27) latching registers, and for a respectively providing an instruction HIT or a data HIT signal, in case of address coincidence, and logical control means (40) operative in response to said HIT signals and to the signals present on said input control bus:

in case of instruction or data HIT to transfer through said second mutliplexer and to load in said output register, the information presented in said third or fourth register respectively, to transfer through said first multiplexer, to said working memory, the address stored in said incrementing register, to start a memory read operation at said next address and to load said third or fourth register with the information read out from said working memory and said first or second register with the next address in output from said incrementing register;

in case of no HIT, to transfer in a first time phase, through said first multiplexer, to said working memory, the current address stored in said current address latching register, to start a memory read operation at said current address and to load, through said second multiplexer, in said output register (30) the information read out from memory and received through said input bus, and to transfer, in a second time phase, to said working memory and through said first multiplexor, said next address, stored in said incrementing register, to start a second memory read operation at said next address and to load the information read out from memory in said third or fourth register respectively and the address contained in said incrementing register in said first or second register respectively, depending on whether the information previously read out from memory at the current address was an instruction or a data.

2. Cache memory as claimed in claim 1, for a data processing system in which the working memory is organized in pages each identified by a row address an readable in page mode, wherein said current address latching register has a first (20) and a second (21) section, the first section for latching bits of a row address, the second section for latching bits of a column address, wherein said incrementing register is comprised of a section for incrementing and latching the only column addresses, wherein said first multiplexer has inputs connected exclusively to the output of said second section and to the outputs of said incrementing register, the row addresses of said memory being directly provided from the output of said first section, and wherein said logical control means comprises logical circuits for detecting if a next address, incremented from a current address, pertains to the same memory page, and for enabling the execution of a second memory read operation, in page mode, only if the incremented address pertains to the same memory page of the current address.

3. Cache memory as claimed in claim 1, for a data processing system in which a working memory is arranged for reading double words of 4 bytes, each referenced by a binary address code of N bits, and the central processing unit may request the reading of 2 bytes information, referenced by a binary address code of N+1 bits where the N most significant bits references the memory location of 4 bytes where the requested information is contained and the less significant bit identifies the information position within the memory double word, wherein said logical control means comprises logical circuits which in presence of said least significant bit at logic level 0 inhibit, in case of HIT, the execution of said memory read operation at said next address as well as the loading of said first or second register and said third or fourth registers, and in case of no HIT causes in said first time phase, the inhibition from incrementing of said incrementing register, the loading of said first or second register with the information present in the output of said incrementing register, the loading of said third or fourth register with the information read out from said working memory, and the inhibition of any operation to be performed in said second time phase.

4. Cache memory as claimed in claim 1 comprising further status logic means, operative in response to said HIT signals and to said control signals on said input control bus, to inhibit at least said first comparator from further generating a HIT signal in case of instruction HIT occurring during a memory write operation, to inhibit at least said second comparator from further generating a HIT signal in case of data HIT occurring during a memory write operation, and for enabling said first or second comparator respectively, once a memory read operation has been performed, without error, of an instruction or a data respectively.

* * * * *